(12) United States Patent
Nishimura (10) Patent No.: US 12,229,914 B2
(45) Date of Patent: Feb. 18, 2025

(54) HIGHLIGHT RECOVERY FOR IMAGE PROCESSING PIPELINE

(71) Applicant: Google LLC, Mountain View, CA (US)

(72) Inventor: Jun Nishimura, San Jose, CA (US)

(73) Assignee: Google LLC, Mountain View, CA (US)

( * ) Notice: Subject to any disclaimer, the term of this patent is extended or adjusted under 35 U.S.C. 154(b) by 386 days.

(21) Appl. No.: 17/616,544

(22) PCT Filed: Nov. 2, 2020

(86) PCT No.: PCT/US2020/058528
§ 371 (c)(1),
(2) Date: Dec. 3, 2021

(87) PCT Pub. No.: WO2021/091820
PCT Pub. Date: May 14, 2021

(65) Prior Publication Data
US 2022/0261954 A1  Aug. 18, 2022

Related U.S. Application Data

(60) Provisional application No. 62/931,073, filed on Nov. 5, 2019.

(51) Int. Cl.
*G06T 3/4015* (2024.01)
*G06T 1/20* (2006.01)
(Continued)

(52) U.S. Cl.
CPC ............. *G06T 3/4015* (2013.01); *G06T 1/20* (2013.01); *G06T 7/90* (2017.01); *G06T 11/001* (2013.01); *G06T 2207/10024* (2013.01)

(58) Field of Classification Search
CPC ........... G06T 3/4015; G06T 1/20; G06T 7/90; G06T 11/001; G06T 2207/10024; H04N 1/6075
See application file for complete search history.

(56) References Cited

U.S. PATENT DOCUMENTS 9,014,504 B2  4/2015  Lim et al.
10,070,109 B2  9/2018  Lim et al.
(Continued)

FOREIGN PATENT DOCUMENTS

CN  101489022  7/2009
CN  101523888  9/2009
(Continued)

OTHER PUBLICATIONS

Office Action in Chinese Appln. No. 202080066899.0, mailed on Aug. 30, 2023, 28 pages (with English translation).
(Continued)

*Primary Examiner* — Ross Varndell
(74) *Attorney, Agent, or Firm* — Fish & Richardson P.C.

(57) ABSTRACT

Methods, systems, and apparatus, including computer programs encoded on computer storage media, for performing highlight recovery. One of the methods includes receiving raw image data of an image, the raw image data comprising, for each of a plurality of highlight regions in the image, original channel values for one or more channels of the highlight region; processing the raw image data to generate updated image data, wherein the updated image data comprises updated channel values for each highlight region in the image, and wherein, for each of one or more highlight regions of the image, one or more updated channel values of the highlight region exceed a maximum channel value according to a predetermined data precision; and performing a hue correction process on the updated channel values of the one or more highlight regions of the image to generate final channel values that satisfy the predetermined data precision.

15 Claims, 7 Drawing Sheets

(51) Int. Cl.
*G06T 7/90* (2017.01)
*G06T 11/00* (2006.01)

(56) References Cited

U.S. PATENT DOCUMENTS

| | | | |
|---|---|---|---|
| 2008/0088858 | A1 | 4/2008 | Marcu et al. |
| 2012/0288192 | A1 | 11/2012 | Heidrich et al. |
| 2018/0007332 | A1* | 1/2018 | Lim ............... H04N 23/741 |
| 2019/0156516 | A1* | 5/2019 | Nikkanen ............... H04N 23/73 |

FOREIGN PATENT DOCUMENTS

| | | |
|---|---|---|
| CN | 103503429 | 1/2014 |
| CN | 103888743 | 6/2014 |
| CN | 104253930 | 12/2014 |
| CN | 105354599 | 2/2016 |
| CN | 105741248 | 7/2016 |
| CN | 106559658 | 4/2017 |
| CN | 106709893 | 5/2017 |
| CN | 108259701 | 7/2018 |
| CN | 109978848 | 7/2019 |
| CN | 110022469 | 7/2019 |
| JP | 2001-157018 | 6/2001 |
| JP | 2004-304303 | 10/2004 |
| JP | 2012-191635 | 10/2012 |
| WO | WO 2014112291 | 7/2014 |
| WO | WO 2016152414 | 9/2016 |

OTHER PUBLICATIONS

Aiping et al., "Low-Light Image Enhancement Based on Tone Mapping and Dark Channel Fusion" Journal of Tianjin University, vol. 51, Issue 7, Jul. 2018, 769-776 (with English abstract).

Liang et al., "Based on dynamic background update and dark channel prior of fire smoke detection algorithm" Computer Applications Studies, vol. 34, Issue 3, May 2017, 958-960 (with English abstract).

Notice of Allowance in Chinese Appln. No. 202080066899.0, mailed on Feb. 4, 2024, 8 pages (with English translation).

Notice of Allowance in Japanese Appln. No. 2022-521331, mailed on Dec. 26, 2023, 5 pages (with English translation).

Robin, "Superbend upgrade at the Advanced Light Source" Proceedings of the 2003 Particle Accelerator Conference, May 2004, 224-228.

Office Action in Japanese Appln. No. 2022-521331, mailed on Aug. 8, 2023, 10 pages (with English translation).

IN Office Action in Indian Appln. No. 202247018307, dated Aug. 24, 2022, 6 pages (with English Translation).

PCT International Search Report and Written Opinion in International Appln. No. PCT/US2020/058528, dated Jan. 29, 2021, 13 pages.

PCT International Preliminary Report on Patentability in International Appln. No. PCT/US2020/058528, dated May 19, 2022, 8 pages.

Notice of Allowance in European Appln. No. 20817107.4, dated Jun. 21, 2023, 8 pages.

\* cited by examiner

HIGHLIGHT RECOVERY FOR IMAGE PROCESSING PIPELINE

CROSS-REFERENCE TO RELATED APPLICATION

This application is a national phase entry under 35 U.S.C. 371 of PCT Application Serial No. PCT/US2020/058528, filed on Nov. 2, 2020, which claims priority to U.S. Patent Application Ser. No. 62/931,073, filed on Nov. 5, 2019. The entirety of each of the foregoing is incorporated by reference.

BACKGROUND

This specification relates to image processors. Image processors are domain-specific processing devices that are designed to process captured image data.

Some image processors have an image processing pipeline implemented by application-specific hardware. In this specification, an image processing pipeline is defined as a set of one or more components, referred to as "blocks," that perform any intermediate digital image processing between an image source, e.g., a camera, and an image renderer, e.g., a computer or phone screen.

Some blocks of image processing pipelines increase the gain of the image signals, i.e., increase the values of respective channels of pixel data of the image. Typically, blocks can only increase the gain of a pixel up to a certain point. Pixels implicitly have a bit precision that defines a maximum value that the respective channels of pixel data can take. When more gain is applied by a block than is allowed by the bit precision, the pixel values are often "clipped" by the block to be equal to the maximum value allowed by the bit precision. This commonly leads to image degradation known as "highlight clipping," in which certain areas of the image have distorted colors due to clipped pixel values. For example, if every channel of the pixels in a certain area is clipped, then the area may have uniform maximum pixel values, e.g., which are often rendered as areas that are completely white.

For convenience, this specification contains examples using the RGB color space, i.e., where the channels include an R channel, a G channel, and a B channel. The subject matter described in this specification can be applied to any appropriate color space, e.g., the RGrGbB color space or the RGBA color space, to name just a few examples.

Further, for convenience, this specification contains examples that refer to processing individual pixels to recover the hue of the pixels. The subject matter described in this specification can be applied more generally to process highlight regions to recover the hue of the highlight regions, wherein a pixel is an example of a highlight region. Another example of a highlight region is a group of four pixels arranged in a two-by-two grid in a color filter array. In this example, each of the pixels in the group of four pixels can have a single value representing a single color, and channels of the highlight region can be the values of the four pixels. As a particular example, an image can have highlight regions that are two-by-two grids of pixels if the image has been processed using a Bayer filter.

Highlight recovery refers to techniques for correcting for highlight clipping by restoring color information in clipped areas of an image.

One technique for performing highlight recovery in hardware uses color propagation. To perform color propagation highlight recovery, color values from pixels that have not been clipped and that neighbor the clipped areas are propagated into the clipped areas. Thus, the color values of the unclipped pixels are intended to "bleed over" to correct for clipped areas.

However, performing color propagation highlight recovery in hardware has several drawbacks. First, color propagation requires a large random access memory (RAM), e.g., requires a larger silicon wafer to be deployed onto the image processor than would otherwise be necessary. This is because during color propagation highlight recovery, the image processor must keep multiple pixel values in memory. In particular, the raster scan of incoming image data requires the pixel values of unclipped pixels that are neighboring clipped pixels in the image to be buffered in SRAM or DRAM. Increasing buffer sizes in turn increases the size, cost, and complexity of the hardware.

Second, color propagation has a natural limit on the size of the area that can be effectively corrected. In other words, if the clipped area is large, the color information from neighboring pixels cannot be reliably used to correct for highlight clipping in pixels in the center of the large clipped area.

Figure 1:
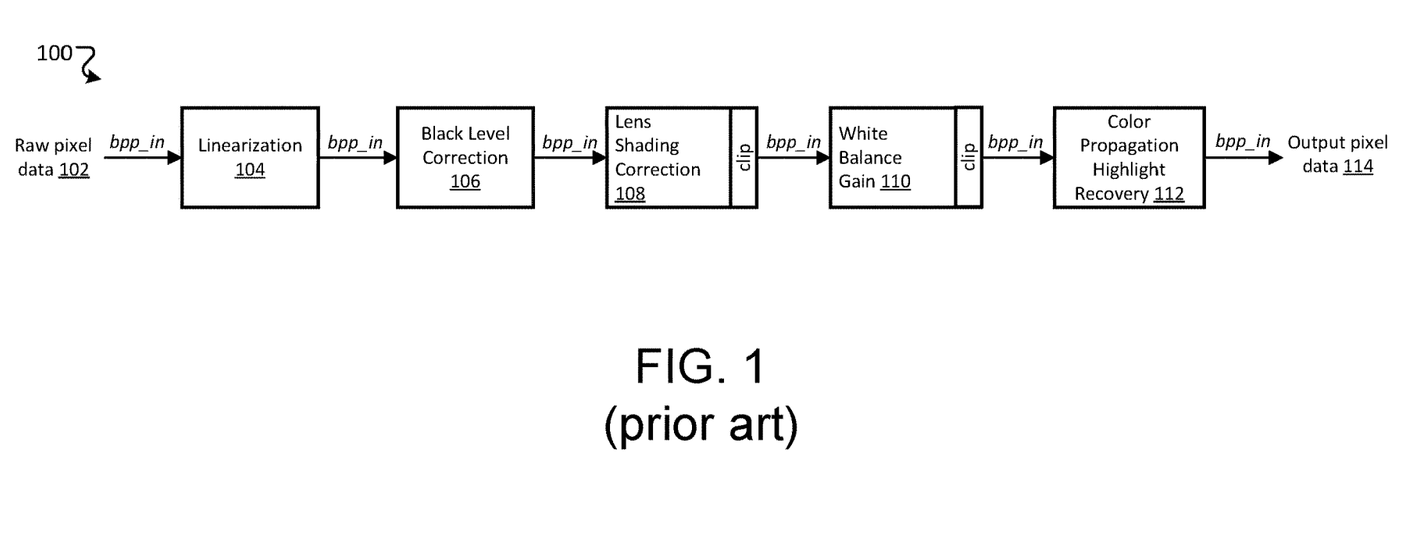
FIG. 1 is a block diagram of an image processing pipeline of a prior art image signal processor that performs color propagation highlight recovery.

FIG. 1 is a block diagram of an image processing pipeline 100 of a prior art image signal processor (ISP) that performs color propagation highlight recovery.

The input to the ISP is raw pixel data 102, e.g., pixel data captured by a camera. The raw pixel data 102 includes a value for one or more channels for every pixel. For instance, each pixel can include an R channel, a G channel, and a B channel; as a particular example, a pixel might have channel values (250, 120, 50).

The input data for each pixel in the raw pixel data 102 has a bit precision of bpp_in, where "bpp" is short for "bits per pixel." An example bpp_in is 24 bpp, where 8 bits are allotted to each of the R, G, and B channels, respectively. A bpp of 24 allows for each channel to have a value between 0 and 255.

After receiving the raw pixel data 102, the ISP can process the raw pixel data using a sequence of one or more blocks 104, 106, 108, and 110 before performing color propagation highlight recover in block 112 to generate output pixel data 114. One or more of the blocks can be non-gain-applying blocks (in the example depicted in FIG. 1, block 104 and 106). One or more of the blocks can be gain applying blocks (in the example depicted in FIG. 1, blocks 108 and 110). Although FIG. 1 depicts a sequence of non-gain-applying blocks followed by a sequence of gain-applying blocks, generally the gain-applying and non-gain-applying blocks can be in any order in the ISP.

The non-gain-applying blocks of the ISP are blocks that do not apply any gain to the data precision of the input data to the block. In other words, the output data generated by a non-gain-applying block can be represented with the same data precision bpp_in as the input data, without loss of accuracy. For example, the non-gain-applying blocks of the ISP can include a linearization block 104 and a black level correction block 106.

The gain-applying blocks of the ISP do apply gain to the data precision of the input data to the block. In other words, the output data generated by a gain-applying block can required a higher data precision that the data precision bpp_in of the input data to the block. That is, for some pixels represented by the input data to the block, a higher data precision than bpp_in is required in order to encode, without any loss of accuracy, the respective output data corresponding to the pixel generated by the block. For example, the gain-applying blocks of the ISP can include a lens shading correction block 108 and a white balance gain block 110.

Conventionally, the output data generated by any block in the ISP must maintain the data precision of the input of the block. Therefore, the gain-applying blocks 108 and 110 have to "clip" the respective output data that represents each pixel whose value exceeds the maximum value allowed by the data precision bpp_in. For each such pixel, there is at least one channel whose value the block increased enough so that the value surpasses the data precision allotted to that channel. For such channels, the block sets the value of the channel to be the maximum value allowed by the data precision bpp_in.

As a particular example, the gain-applying white balance gain block 110 can have an allowed data precision of 24 bpp. The white balance gain block 110 might receive input data that includes a pixel whose R channel value is 250, and the block 110 might change the R channel value for the pixel from 250 to 260. In this case, the white balance gain block 110 clips the R channel value to 255, the maximum value allowed with 24 bpp.

Clipping pixel values changes the "hue" of the pixel, which represents the relative proportions of the R, G, and B channels. For example, if a gain-applying block generates a pixel value of (380, 240, 0), which is a red-orange color, then the block clips the pixel value to be (255, 240, 0), which is yellow. This issue arises because only the R channel is clipped while the G and B channels are left untouched, and so the relative proportion of the channel values changes.

Following the gain applying blocks 108 and 110, there is a color propagation highlight recovery block 112, which processes the pixels which have been clipped in order to recover their hue. To do so, for each clipped pixel, the color propagation highlight recovery block 112 surveys the closest surrounding pixels that were not clipped, and infers the hue of the clipped pixel from the hues of the surrounding unclipped pixels. This process can yield good results when performed on a relatively small region of clipped pixels, e.g., a cluster of two or four pixels that were clipped. However, this process has several shortcomings that arise when performed on larger regions of clipped pixels. In this specification, a "region" is a group of contiguous pixels of an image.

When the color propagation highlight recovery process is performed on larger regions of clipped pixels, the recovered hues for pixels are often incorrect. For example, in order to recover the hue of a pixel in the center of the region of clipped pixels, the color propagation highlight recovery block 112 must use the hues of the closest unclipped pixels. However, the closest unclipped pixels may be many pixels away, e.g., 50 pixels away. Inferring the hue of a clipped pixel from the hues of unclipped pixels 50 pixels away can have very mixed results, as the original unclipped values of the clipped pixel can be very different from the unclipped values of pixels 50 pixels away. The recovered hues generated using color propagation highlight recovery can also create undesirable patterns. For example, there can be a visible discontinuity between the color of a clipped region and the color of a neighboring unclipped region.

Furthermore, if the R channel of every pixel in a large clipped region was clipped while the G and B channels were not clipped, then there may be a wide range of R channel values that were all clipped to the same value. Therefore, the color propagation highlight recovery block 112 may recover a similar hue for every pixel in the region, even though their original hues were dissimilar. For example, with a data precision of 24 bpp, in the same region of clipped pixels there could be one pixel whose pre-clipped R channel value was 380 and another pixel whose pre-clipped channel value was 260. After clipping, both pixels have an R channel value of 255. Only this clipped value is available to the color propagation highlight recovery block 112, and so it is impossible for the block 112 to recover the fact that the first pixel had a far higher unclipped R channel value.

The color propagation highlight recovery process also has significant hardware cost. For each clipped region, the raster scan order of the image pixel data can require that the entire clipped region be buffered in SRAM in order to recover the hue of the clipped pixels in the region, which is a costly requirement when a clipped region is large. Furthermore, the amount of computation required for a clipped region increases super-linearly with the number of pixels in the clipped region; that is, the amount of computation required to recover the hue of a single pixel in the clipped region increases as the number of pixels in the clipped region increases.

Figure 2:
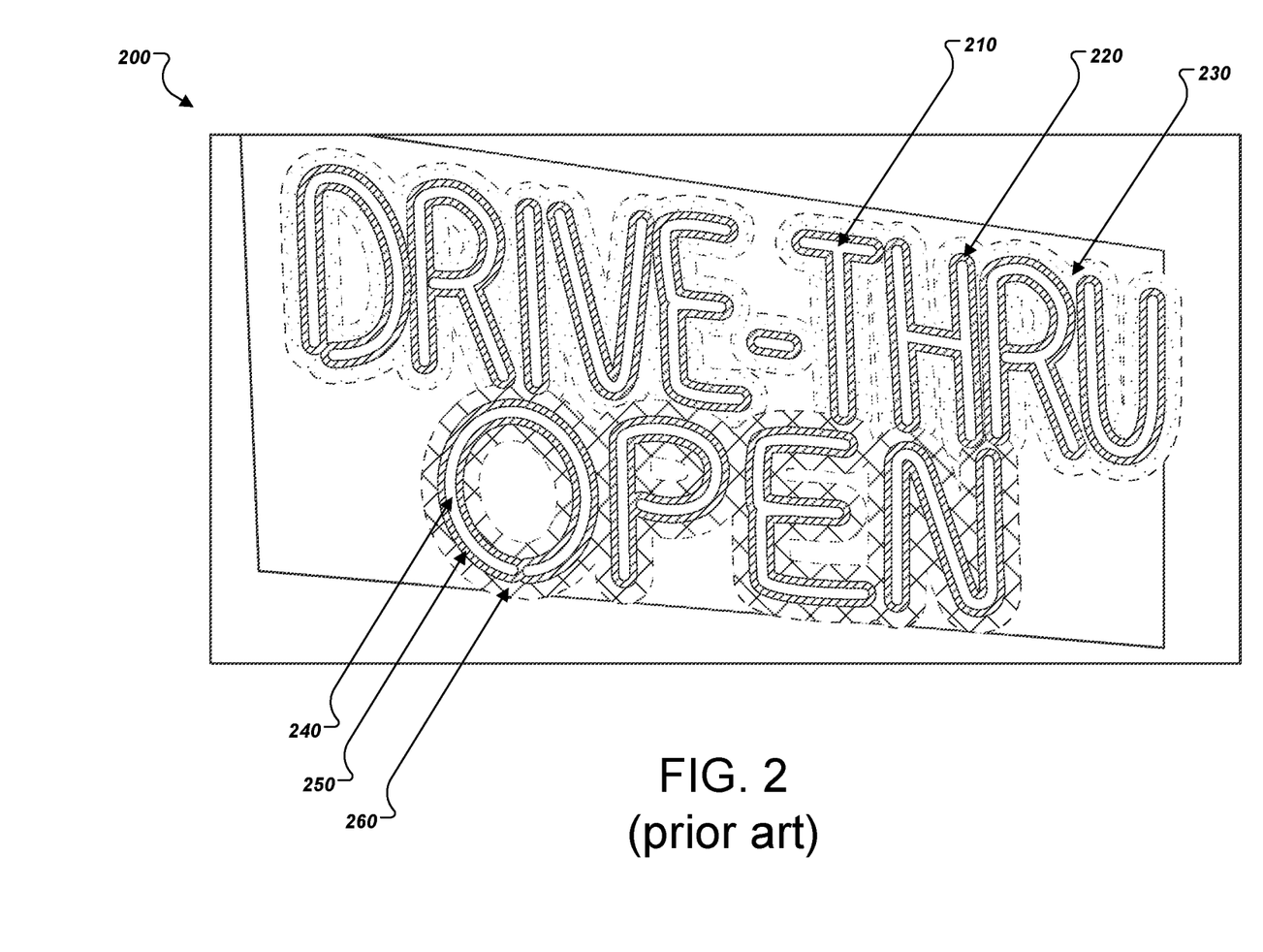
FIG. 2 is a diagram of an example image that was processed by an ISP using color propagation highlight recovery.

FIG. 2 is a diagram of an example image 200 that was processed by a prior art ISP using color propagation highlight recovery.

The image 200 depicts a neon sign that reads "Drive-Thru Open." The letters on the neon sign that read "Drive-Thru" are blue neon lights and the letters on the neon sign that read "Open" are red neon lights.

After the ISP performs color propagation highlight recovery on the image 200, each of the blue letters spelling "Drive-Thru" has three distinct regions: a white region 210, a discolored region 220, and a blue region 230.

In the center of each blue neon letter is the white region 210. The image has white pixels in the white region 210, because the intensity of the neon light in that region resulted in maximum pixel values, given the exposure setting of the device that captured the image 200.

Surrounding the white region 210 of each blue neon letter is the discolored region 220. The pixels of the discolored region 220 should be blue, showing the reflection of blue light coming from the blue neon sign. However, the pixels of the discolored region 220 are cyan (represented by diagonal lines), i.e., a green-blue color, due to incorrect hue recovery performed by the color propagation highlight recovery block of the ISP.

As a particular example, following a gain-applying block with data precision 24 bpp, a pixel might have unclipped channel values (0, 200, 450), which is a solid blue color. After being clipped, the pixel has clipped channel values (0, 200, 255), which is a cyan color.

The color propagation highlight recovery block of the ISP processes the clipped pixels to recover their hues, but the discolored region 220 is a large region containing many clipped pixels. Therefore, because of the shortcomings of the color propagation highlight recovery process described above, the hues of the pixels of the discolored region 220 are not properly recovered, and the final image has cyan pixels in the discolored region 220 instead of blue pixels.

Surrounding the discolored region 220 of each blue neon letter is the blue region 230. The pixels in the blue region 230 did not need to be clipped, and therefore the hue of the pixels was never lost. That is, the gain-applying blocks of the ISP did not apply so much gain to the pixels in the blue region that their pixel values exceeded the maximum value allowed by the data precision of the block. The image therefore correctly has blue pixels (represented by dots) in the blue region 230.

After the ISP performs color propagation highlight recovery on the image 200, the red neon lights spelling "Open"

show similar features. Each of the red letters has three regions: a white region 240, a discolored region 250, and a red region 260.

As described above, in the center of each red neon letter is the white region 240. The image has white pixels in the white region 240, because the intensity of the light in that region resulted in maximum pixel values, given the exposure setting of the device that captured the image 200.

Surrounding the white region 240 of each red neon letter is the discolored region 250. The pixels of the discolored region 250 should be red, showing the reflection of red light coming from the red neon sign. However, the pixels of the discolored region 250 are yellow (represented by diagonal lines), due to incorrect hue recovery performed by the color propagation highlight recovery block of the ISP.

Surrounding the discolored region 250 of each red neon letter is the red region 260. The pixels in the red region 260 did not need to be clipped, and therefore the hue of the pixels was never lost. The image therefore correctly has red pixels (represented by plaid) in the red region 260.

Therefore, as illustrated in the example depicted by FIG. 2, performing color propagation highlight recovery has inherent drawbacks both in the hardware required and in the quality of the resulting images.

SUMMARY

This specification describes a system that performs highlight recovery on a region of pixels whose values have been clipped to satisfy a bit precision requirement, using the unclipped values of the pixels. A pixel that has been processed using techniques described in this specification has the same hue as the unclipped version of the pixel, but satisfies the bit precision requirement.

Particular embodiments of the subject matter described in this specification can be implemented so as to realize one or more of the following advantages.

The highlight recovery process described in this specification performs significantly better than the prior art color propagation highlight recovery described above.

First, the highlight recovery process described herein does not require significant increases to RAM buffer sizes of the ISP, as the color propagation process does. In some implementations, the highlight recovery process described herein can be performed without a RAM buffer altogether. This can provide significant savings in the size, cost, and complexity of the hardware required to execute the ISP.

Second, in some implementations, the effectiveness of the highlight recovery process described here does not decrease as the size of the clipped region increases; the process is consistent for every clipped pixel whose hue must be recovered, regardless of the size of the clipped region that the clipped pixel is in. Thus, the techniques described in this specification are often significantly more accurate than the color propagation process in recovering the hues of pixels, and can do so while still maintaining the required output data precision. Furthermore, in some implementations, the highlight recovery process described herein has minimal color artifacts compared to some prior art techniques, e.g., minimal visual discontinuities between the colors of clipped regions and neighboring unclipped regions in an image.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a system that performs highlight recovery on a region of clipped pixels while maintaining a required data precision.

Figure 3:
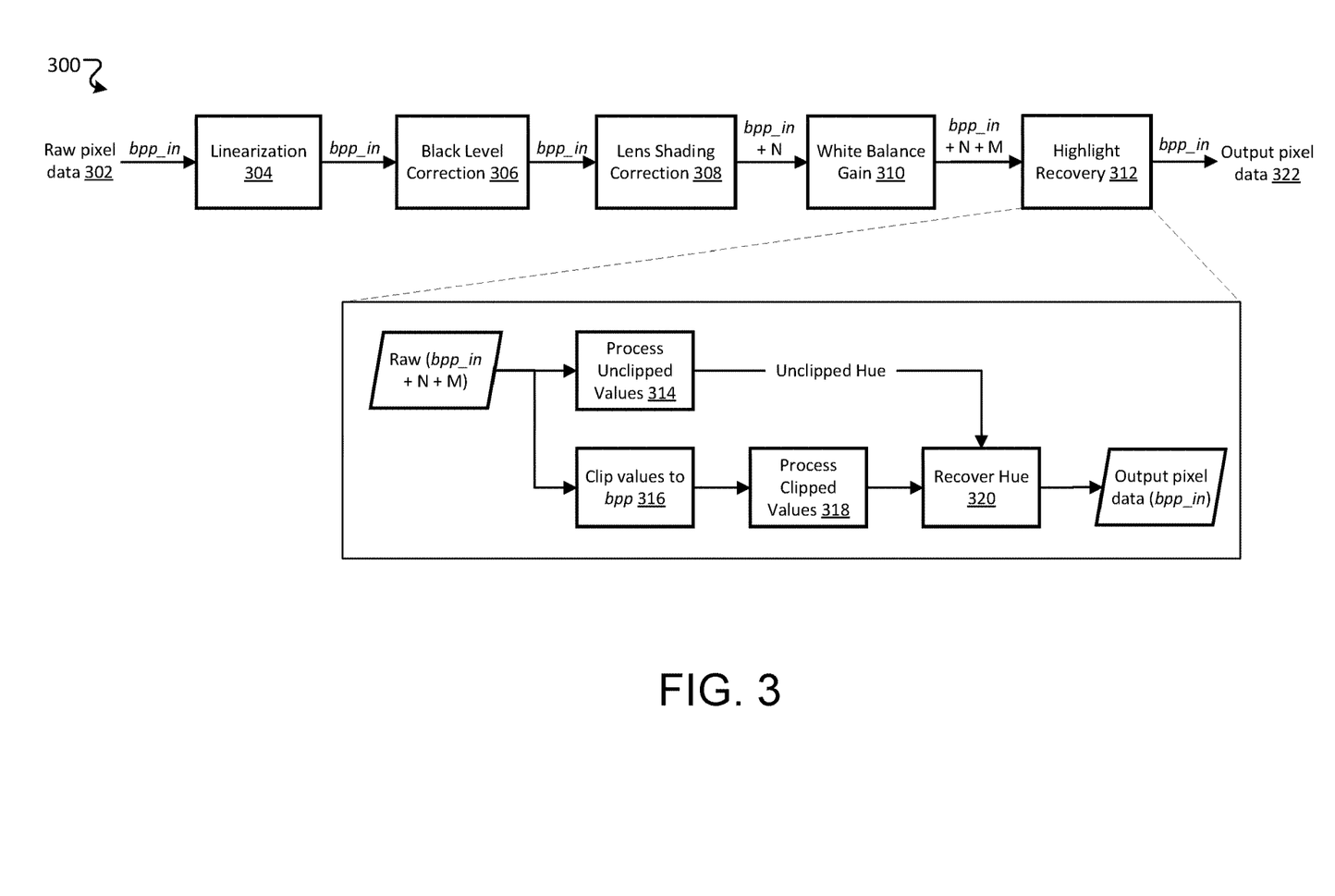
FIG. 3 is a block diagram of an image processing pipeline of an image signal processor that includes a highlight recovery block.

FIG. 3 is a block diagram of an image processing pipeline 300 of an ISP that includes a highlight recovery block 312.

FIG. 1 is a block diagram of an image processing pipeline 100 of a prior art image signal processor (ISP) that performs color propagation highlight recovery.

The input to the ISP is raw pixel data 302, e.g., pixel data captured by a camera. the raw pixel data 302 can include a value of one or more channels for each pixel. The input data for each pixel in the raw pixel data 102 has a bit precision of bpp_in.

After receiving the raw pixel data 302, the ISP can process the raw pixel data 302 using a sequence of one or more blocks 304, 306, 308, and 310 before performing highlight recover in block 312 to generate output pixel data 322. One or more of the blocks can be non-gain-applying blocks (in the example depicted in FIG. 3, block 304 and 306). One or more of the blocks can be gain applying blocks (in the example depicted in FIG. 1, blocks 308 and 310). Although FIG. 3 depicts a sequence of non-gain-applying blocks followed by a sequence of gain-applying blocks, generally the gain-applying and non-gain-applying blocks can be in any order in the ISP.

The non-gain-applying blocks generate output data that has the same data precision bpp_in as the input data to the blocks. For example, the non-gain-applying blocks of the ISP can include a linearization block 304 and a black level correction block 306.

The gain-applying blocks generate output data that requires a higher data precision that the input data to the blocks. That is, one or more pixel values in the output data of the blocks exceed the maximum value allowed by the data precision bpp_in. For example, the gain-applying blocks of the ISP can include a lens shading correction block 308 and a white balance gain block 310.

The gain-applying blocks 308 and 310 do not clip the channel values of the pixels whose data precision exceeds bpp_in. Instead, the blocks maintain the unclipped values of the pixels, allotting more bits per pixel in the output data than were allowed in the input data to the blocks.

As a particular example, the lens shading correction block 308 receives input data with precision bpp_in and adds an additional N bpp, so that the output data of the block 308 has a data precision of bpp_in +N. Similarly, the white balance gain block 310 receives input data with precision bpp_in +N and adds an additional M bpp, so that the output data of the block 310 has a data precision of bpp_in +N+M In some implementations, other gain-applying blocks can also be included in the ISP, e.g., a "Digital Gain" block.

Following the gain applying blocks 308 and 310 is a highlight recovery block 312, which performs a hue correction process on the channel values of the pixels. The highlight recovery block 312 receives input data with precision bpp_in +N+M and generates the output pixel data 322 that has data precision bpp_in. That is, the highlight recovery block 312 recovers the hue of each pixel in the input data of the block 312 while also reducing the data precision of the pixels back down to the required data precision bpp_in. In particular, the highlight recovery block 312 can identify the one or more pixels represented in the input data of the block 312 that have a data precision greater than bpp_in, and processes those pixels so that their unclipped hue is preserved but their data precision is returned to bpp_in. A data precision of bpp_in might be required by a downstream block of the ISP to further process or display the image, or it might be required to satisfy a storage constraint on the size of the image.

In particular, the the highlight recovery block 312 receives unclipped pixel channel data as input. To recover the hue of a pixel whose data precision is greater than bpp_in, the highlight recovery block 312 processes i) the unclipped pixel channel data and ii) a clipped version of the unclipped pixel channel data using a recovery pipeline 313 of the highlight recover block 312.

At block 314 of the recovery pipeline 313, the highlight recovery block 312 processes, for each pixel in the unclipped pixel channel data, the unclipped channel values of the pixel to generate an unclipped hue for the pixel. This process is described in more detail below with reference to FIG. 6.

At block 316 of the recovery pipeline 313, the highlight recovery block 312 clips, for each pixel in the unclipped pixel channel data, the channel values of the pixel to generate clipped channel values. The clipped channel values of the pixel have a data precision of bpp_in.

At block 318 of the recovery pipeline 313, the highlight recovery block 312 processes, for each pixel, the clipped channel values of the pixel to generate a clipped hue for the pixel.

At block 320 of the recovery pipeline 313, the highlight recovery block 312 combines, for each pixel, the unclipped hue of the pixel and the clipped hue of the pixel to recover the hue in the clipped channel values and generate the output pixel data 322. This process is described in more detail below with reference to FIG. 7. The output pixel data 322 includes final pixel channel values for each pixel that have the correct hue and satisfy the data precision requirement of bpp_in. The output pixel data 322 can then be passed to later blocks of the ISP.

For each pixel, processing the pixel using the highlight recovery block 312 to recover the hue of the pixel only requires the ISP to store the clipped and unclipped versions of the pixel's values, instead of the values of the given pixel and multiple surrounding pixels as is required in some existing systems. Thus, the hardware and SRAM requirements of the process described with reference to FIG. 3 are significantly less than in the prior art color propagation highlight recovery process described above. In some implementations, the process of FIG. 3 does not require SRAM at all.

Figure 4:
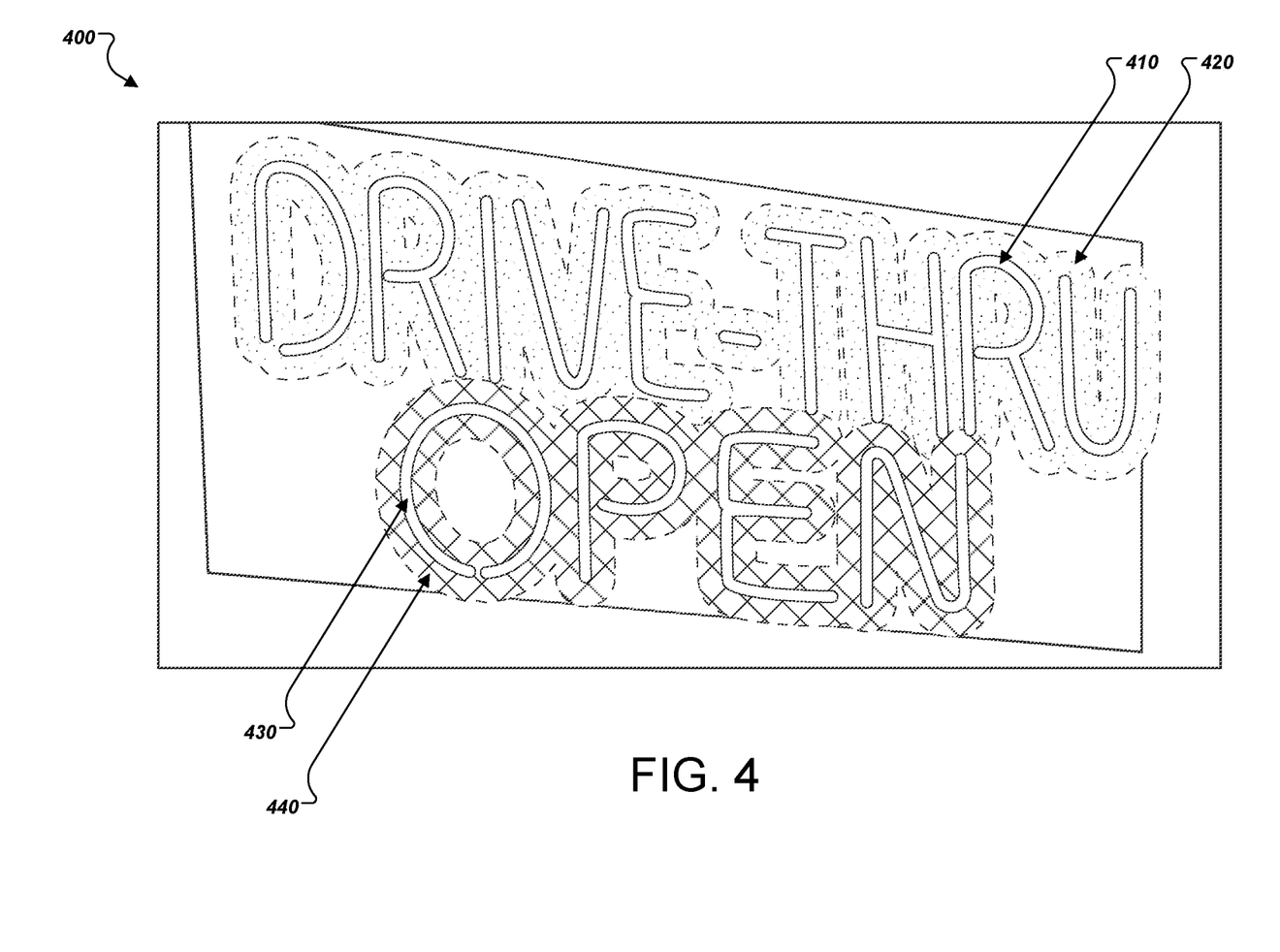
FIG. 4 is a diagram of an example image that was processed by an ISP using a highlight recovery process.

FIG. 4 is a diagram 400 of an example image that was processed by an ISP using a highlight recovery process, e.g., the highlight recover process described above with reference to FIG. 3.

The image is of the same neon sign that reads "Drive-Thru Open" as appears in FIG. 2. The letters that read "Drive-Thru" are blue neon lights and the letters that read "Open" are red neon lights.

As depicted in the diagram 400, each of the blue letters spelling "Drive-Thru" has two regions: a white region 410, and a blue region 420. Unlike in the image generated by color propagation highlight recovery depicted in FIG. 2, there is essentially no discolored region.

In the center of each blue neon letter is the white region 410. The image has white pixels in the white region 410, because the intensity of the light in that region resulted in maximum pixel values, given the exposure setting of the device that generated the image.

Surrounding the white region 410 of each blue neon letter is the blue region 420. Many of the pixels in the blue region 420, particularly those closest to the white region 410, experienced data precision gain. If the values of these pixels had been clipped by the gain applying blocks of the ISP and processed by a color propagation highlight recovery block, e.g., the color propagation highlight recovery block 112 depicted in FIG. 1, then the pixels would have been discolored, as they were in the discolored region 220 of FIG. 2. However, the values of the pixels were not clipped by the gain applying blocks; instead, the values were preserved and later processed by a highlight recovery block of the ISP, e.g., the highlight recovery block 312 depicted in FIG. 3. Thus, the pixels properly recovered their hue, and the image correctly has only blue pixels (represented by dots) in the blue region 420.

The red neon lights spelling "Open" show similar features. Each of the red letters has two regions: a white region 430 and a red region 440. There is no discolored region.

In the center of each red neon letter is the white region 430. The image has white pixels in the white region 240, because the intensity of the light in that region resulted in maximum pixel values, given the exposure setting of the device that generated the image.

Surrounding the white region 320 of each red neon letter is the red region 440. Many of the pixels in the red region 440, particularly those closest to the white region 430, experienced data precision gain and were processed by the highlight recovery block of the ISP. As described above, the pixels properly recovered their hue, and the image correctly has only red pixels (represented by plaid) in the red region 440.

Figure 5:
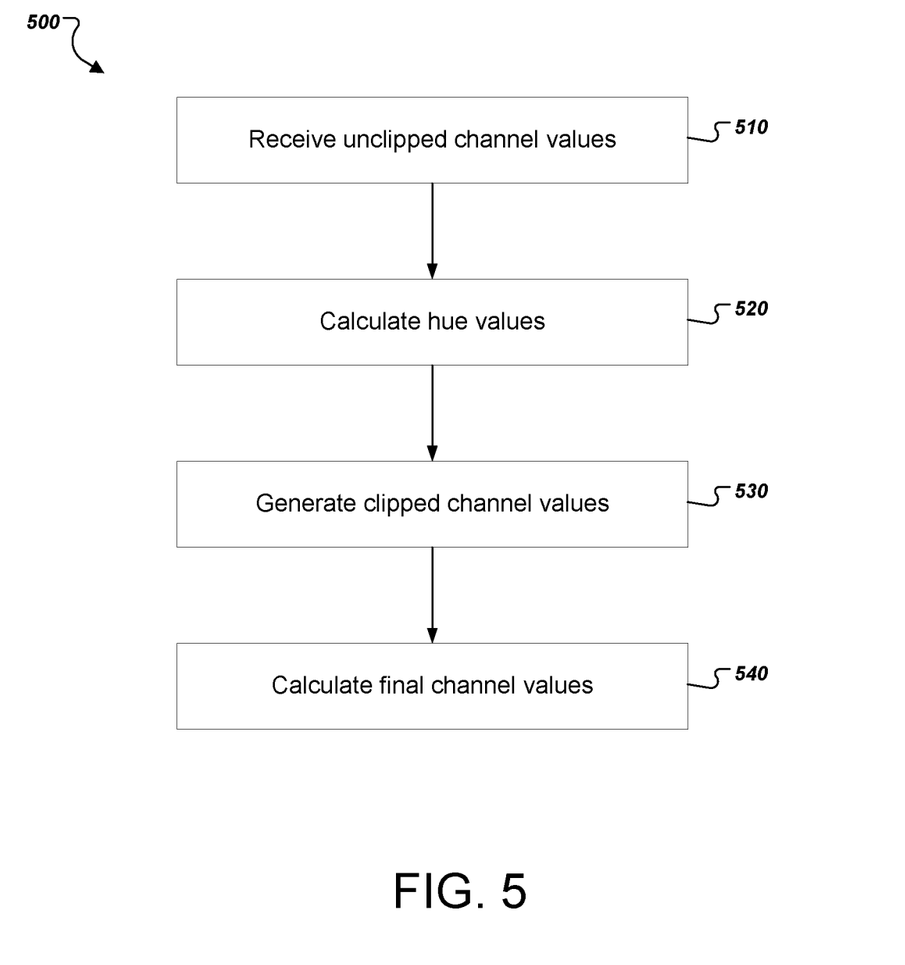
FIG. 5 is a flowchart of an example process for hue correction.

FIG. 5 is a flowchart of an example process 500 for hue correction. The process can be implemented by one or more computer programs installed on one or more computers and programmed in accordance with this specification. For example, the process 500 can be performed by a highlight recovery block of an ISP, e.g., the highlight recovery block 312 shown in FIG. 3. For convenience, the process will be described as being performed by a system of one or more computers.

The system receives unclipped pixel channel values for multiple pixels of an image (step 510). The channel values for one or more pixels have a data precision that exceeds a maximum data precision bpp_in.

The system determines hue values for each pixel using the respective pixel channel values (step 520). An example process for determining hue values is described in more detail below with reference to FIG. 6.

The system generates clipped channel values for each pixel (step 530). A clipped channel value equals the respective unclipped channel value if the unclipped channel value is less than or equal to a threshold value, and equals the threshold value if the unclipped channel value is greater than the threshold value. The threshold value can be determined according to the maximum data precision bpp_in. For example, as stated above, a bpp_in of 24 allows for each channel to have a value between 0 and 255, and so the threshold value can be set to 255.

The system generates, for each pixel, final channel values using the hue values of the pixel and the clipped channel values of the pixel (step 540). An example process for generating final channel values is described in more detail below with reference to FIG. 7. The final channel values have the correct hue and satisfy the data precision requirement, and can be provided to later blocks of the ISP.

Figure 6:
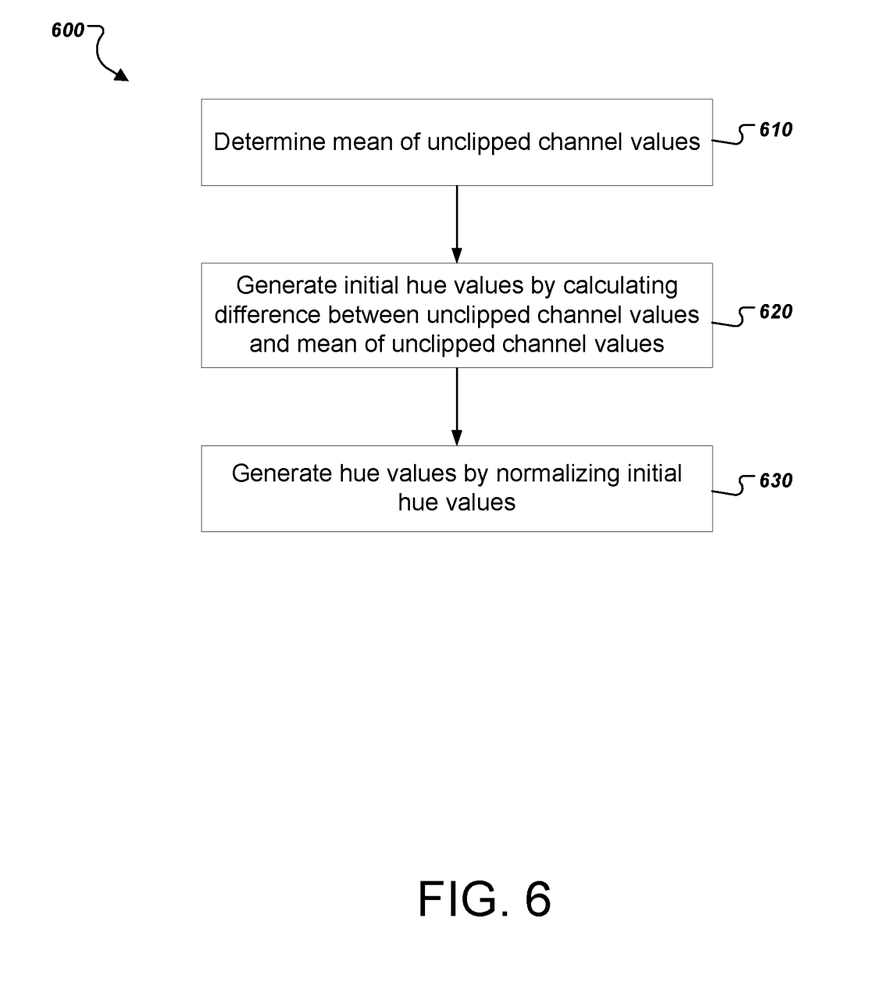
FIG. 6 is a flowchart of an example process for generating hue values of a pixel using unclipped channel values of the pixel.

FIG. 6 is a flowchart of an example process 600 for generating hue values of a pixel using unclipped channel values of the pixel. The process can be implemented by one or more computer programs installed on one or more computers and programmed in accordance with this specification. For example, the process 600 can be performed by a highlight recovery block of an ISP, e.g., the highlight recovery block 312 shown in FIG. 3. For convenience, the process will be described as being performed by a system of one or more computers.

For convenience, the below description refers to pixel channel data that is represented by R, G, and B channels. However, it is to be understood that the process 600 can be applied for any choice of channels.

The system determines a mean $\mu_{unclipped}$ of the unclipped channel values {R,G,B} of the pixel (step 610). For example, the system can determine the mean $\mu_{unclipped}$ to be the average of the channel values, i.e., (R+G+B)/3. As another example, the system can determine $\mu_{unclipped}$ to be a more generic weighted mean. As a particular example, the system can determine $\mu_{unclipped}=w_R R+w_G G+w_B B$, where $w_{\{R,G,B\}} \in [0,1]$ and $w_R+w_G+w_B=1$.

The system generates initial hue values $\mu_{unclipped}$ for the pixel (step 620). For example, the system can generate the initial hue values $\mu_{unclipped}$ by calculating the difference between the unclipped channel values {R,G,B} and the mean $\mu_{unclipped}$ of the unclipped channel values, i.e., $\mu_{unclipped}=\{R,G,B\}-\mu_{unclipped}$.

Figure 7:
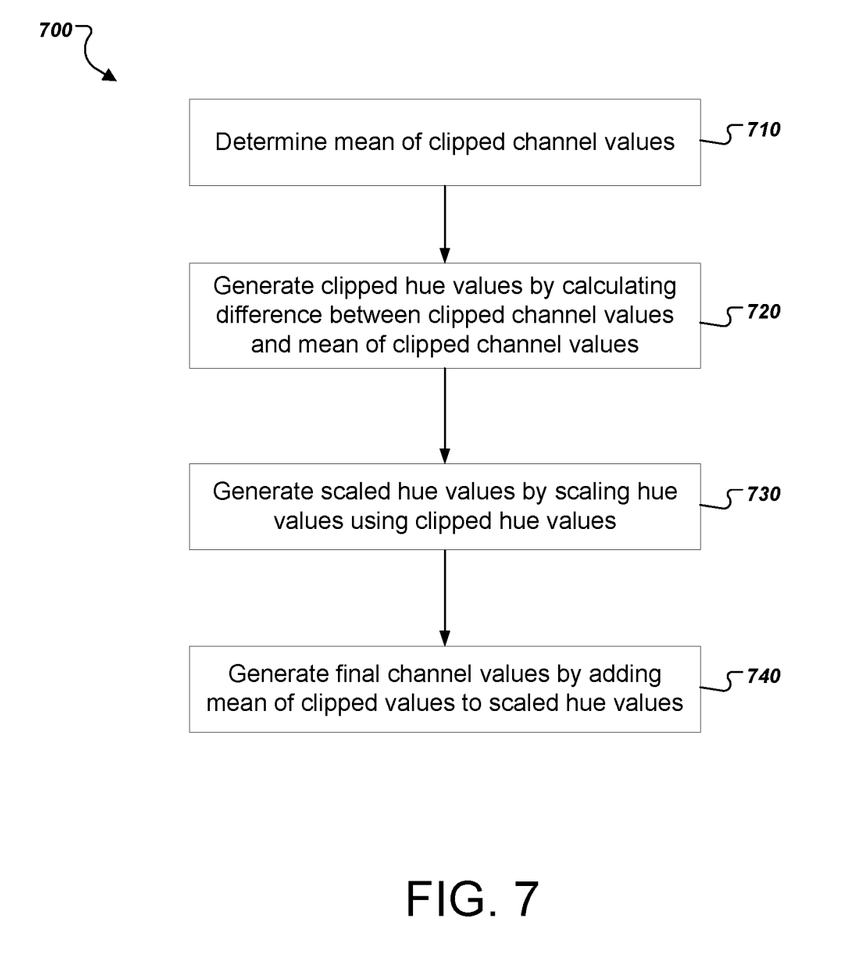
FIG. 7 is a flowchart of an example process for generating final channel values of a pixel using clipped channel values and hue values of the pixel.

The system generates hue values $hue_{unclipped}$ by normalizing the initial hue values (step 630). The initial hue values $\mu_{unclipped}$ can be normalized by dividing the initial hue values $\mu_{unclipped}$ by a length of a vector composed of the initial hue values, $$\text{e.g., } hue_{unclipped} = \frac{\rho_{unclipped}}{\|\rho_{unclipped}\|_2},$$

where $\|\cdot\|_2$ is the L2-norm. The hue values $hue_{unclipped}$ can be used to recover the hue of clipped versions of the channel values of the pixel, e.g., using the process described below with reference to FIG. 7.

FIG. 7 is a flowchart of an example process 700 for generating final channel values of a pixel using clipped channel values and hue values of the pixel. The process can be implemented by one or more computer programs installed on one or more computers and programmed in accordance with this specification. For example, the process 700 can be performed by a highlight recovery block of an ISP, e.g., the highlight recovery block 312 shown in FIG. 3. For convenience, the process will be described as being performed by a system of one or more computers.

For convenience, the below description refers to pixel channel data that is represented by R, G, and B channels. However, it is to be understood that the process 600 can be applied for any choice of channels.

The system determines a mean $\mu_{clipped}$ of the clipped channel values $\{R,G,B\}_{clipped}$ (step 710). As described above, the system can determine the mean $\mu_{clipped}$ to be the average of the channel values, i.e., $(R_{clipped}+G_{clipped}+B_{clipped})/3$. As another example, the system can determine the $\mu_{clipped}$ to be a more generic weighted mean, e.g., $w_R R_{clipped}+w_G G_{clipped}+w_B B_{clipped}$.

The system generates clipped hue values $\mu_{clipped}$ (step 720). For example, the system can generate the initial hue values $\mu_{clipped}$ by calculating the difference between the clipped channel values $\{R,G,B\}_{clipped}$ and the mean $\mu_{clipped}$ of the clipped channel values, i.e., $\mu_{clipped}=\{R,G,B\}_{clipped}-\mu_{clipped}$.

The system obtains unclipped hue values $hue_{unclipped}$ of the pixel generated using the unclipped channel values of the pixel (step 725). For example, the system can generate the hue values $hue_{unclipped}$ using the process described above with respect to FIG. 6.

The system generates scaled hue values $hue_{scaled}$ by scaling the unclipped hue values of the pixel $hue_{unclipped}$ using the clipped hue values $\rho_{clipped}$ (step 730). The unclipped hue values $hue_{unclipped}$ can be scaled by multiplying the unclipped hue values by a length of a vector composed of the clipped hue values. As a particular example, the system can compute $$hue_{scaled}=hue_{unclipped}\cdot\|\rho_{clipped}\|_2$$

where $\|\cdot\|_2$ is the L2-norm.

The system generates final channel values $\{R,G,B\}_{final}$ for the pixel using the scaled hue values $hue_{scaled}$ (step 794). For example, the system can determine the sum of i) the mean of the clipped values $\mu_{clipped}$ and i) the scaled hue values $hue_{scaled}$, i.e., $$\{R,G,B\}_{final}=hue_{scaled}+\mu_{clipped}.$$

The system can then pass the final values $\{R,G,B\}_{final}$ to later blocks of the ISP.

In some implementations, the system can apply tone adjustments to each of the channels of a given pixel before or after highlight recovery.

In some implementations, the system can perform highlight recovery on an image after demosaicing the image. In other words, the system can process the output of an image sensor overlaid with a color filter array, e.g., a Bayer filter, to convert the output into a different color space, e.g., the RGB color space. In some other implementations, the system can demosaic the image after performing highlight recovery.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a system comprising:
an image capture device configured to generate raw image data of an image, the raw image data comprising, for each of a plurality of highlight regions in the image, original channel values for one or more channels of the highlight region; and
an image signal processor comprising:
one or more components of an image processing pipeline that are configured to process the raw image data to generate updated image data, wherein the updated image data comprises updated channel values for each highlight region in the image, and wherein, for each of one or more highlight regions of the image, one or more updated channel values of the highlight region exceed a maximum channel value according to a predetermined data precision, and
a highlight recovery circuit configured to perform a hue correction process on the updated channel values of the one or more highlight regions of the image, wherein performing the hue correction process comprises processing the updated channel values to generate final channel values that i) satisfy the predetermined data precision and ii) recover hue values of the one or more highlight regions of the image.

Embodiment 2 is the system of embodiment 1, wherein the highlight regions are individual pixels and wherein the one or more channels comprise an R channel, a G channel, and a B channel.

Embodiment 3 is the system of embodiment 1, wherein the highlight regions are groups of four pixels arranged in two-by-two grids in a color filter array, wherein each of the pixels has a single value representing a single color, and wherein the one or more channels comprise the values of the four pixels.

Embodiment 4 is the system of any one of embodiments 1-3, wherein performing the hue correction process comprises, for each highlight region in the image:
calculating hue values including adjusting the respective updated channel values for each of the one or more channels of the highlight region, wherein the hue values represent a proportion of the updated channel values of the channels;
generating a clipped channel value for each of the one or more channels, wherein the clipped channel value equals the respective updated channel value if the updated channel value is less than or equal to the maximum channel value, and equals the maximum channel value if the updated channel value is greater than the maximum channel value; and
calculating a final channel value for each of the one or more channels including adjusting the respective clipped channel values using the respective hue values to emulate the proportion of the updated channel values of the channels.

Embodiment 5 is the system of embodiment 4, wherein calculating, for each highlight region in the image, hue values further comprises:
determining a measure of central tendency of the respective updated channel values of the one or more channels of the highlight region; and
calculating hue values including adjusting the respective updated channel values for each of the one or more channels using the measure of central tendency of the updated channel values of the highlight region.

Embodiment 6 is the system of embodiment 5, wherein calculating, for each highlight region in the image, a final channel value for each of the one or more channels comprises:
determining a measure of the central tendency of the clipped channel values of the one or more channels; and
calculating a final channel value for each of the one or more channels including adjusting the respective clipped channel values using the respective hue values and the measure of central tendency of the clipped channel values of the highlight region.

Embodiment 7 is the system of embodiment 6, wherein for each highlight region:
the measure of central tendency of the updated channel values and the clipped channel values of the one or more channels is a mean of the respective channel values; and
calculating the hue values of the one or more channels comprises:
generating initial hue values by calculating the difference between the updated channel values and the mean of the updated channel values; and
generating the hue values by normalizing the initial hue values comprising dividing the initial hue values by a length of a first vector wherein each element of the first vector is an initial hue value.

Embodiment 8 is the system of embodiment 7, wherein calculating the final channel values of the one or more channels comprises:
generating scaled hue values by scaling the hue values by a length of a second vector, wherein each element of the second vector is a difference between the clipped channel value of a channel and the mean of the clipped channel values; and
generating the final channel values by adding the scaled hue values to the mean of the clipped channel values.

Embodiment 9 is a method comprising:
receiving raw image data of an image, the raw image data comprising, for each of a plurality of highlight regions in the image, original channel values for one or more channels of the highlight region;
processing the raw image data to generate updated image data, wherein the updated image data comprises updated channel values for each highlight region in the image, and wherein, for each of one or more highlight regions of the image, one or more updated channel values of the highlight region exceed a maximum channel value according to a predetermined data precision; and
performing a hue correction process on the updated channel values of the one or more highlight regions of the image, wherein performing the hue correction process comprises processing the updated channel values to generate final channel values that i) satisfy the predetermined data precision and ii) recover hue values of the one or more highlight regions of the image.

Embodiment 10 is the method of embodiment 9, wherein the highlight regions are individual pixels and wherein the one or more channels comprise an R channel, a G channel, and a B channel.

Embodiment 11 is the method of embodiment 9, wherein the highlight regions are groups of four pixels arranged in two-by-two grids in a color filter array, wherein each of the pixels has a single value representing a single color, and wherein the one or more channels comprise the values of the four pixels.

Embodiment 12 is the method of any one of embodiments 8-11, wherein performing the hue correction process comprises, for each highlight region in the image:
calculating hue values including adjusting the respective updated channel values for each of the one or more channels of the highlight region, wherein the hue values represent a proportion of the updated channel values of the channels;
generating a clipped channel value for each of the one or more channels, wherein the clipped channel value equals the respective updated channel value if the updated channel value is less than or equal to the maximum channel value, and equals the maximum channel value if the updated channel value is greater than the maximum channel value; and
calculating a final channel value for each of the one or more channels including adjusting the respective clipped channel values using the respective hue values to emulate the proportion of the updated channel values of the channels.

Embodiment 13 is the method of embodiment 12, wherein calculating, for each highlight region in the image, hue values further comprises:
determining a measure of central tendency of the updated channel values of the one or more channels of the highlight region; and calculating hue values including adjusting the updated channel values for each of the one or more channels using the measure of central tendency of the updated channel values of the highlight region.

Embodiment 14 is the method of embodiment 13, wherein calculating, for each highlight region in the image, a final channel value for each of the one or more channels comprises:

determining a measure of the central tendency of the clipped channel values of the one or more channels; and calculating a final channel value for each of the one or more channels including adjusting the respective clipped channel values using the respective hue values and the measure of central tendency of the clipped channel values.

Embodiment 15 is the method of embodiment 14, wherein for each highlight region:

the measure of central tendency of the updated channel values and the clipped channel values of the one or more channels is a mean of the respective channel values; and calculating the hue values of the one or more channels comprises:

generating initial hue values by calculating the difference between the updated channel values and the mean of the updated channel values; and generating the hue values by normalizing the initial hue values comprising dividing the initial hue values by a length of a first vector wherein each element of the first vector is an initial hue value.

Embodiment 16 is the method of embodiment 15, wherein calculating the final channel values of the one or more channels comprises:

generating scaled hue values by scaling the hue values by a length of a second vector, wherein each element of the second vector is a difference between the clipped channel value of a channel and the mean of the clipped channel values; and generating the final channel values by adding the scaled hue values to the mean of the clipped channel values.

Embodiment 17 is one or more non-transitory computer storage media encoded with computer program instructions that when executed by a plurality of computers cause the plurality of computers to perform the method of any one of embodiments 9-16.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:

an image capture device configured to generate raw image data of an image, the raw image data comprising, for each of a plurality of highlight regions in the image, original channel values for one or more channels of the highlight region; and an image signal processor comprising:

one or more components of an image processing pipeline that are configured to process the raw image data to generate updated image data, wherein the updated image data comprises updated channel values for each highlight region in the image, and wherein, for each of one or more highlight regions of the image, one or more updated channel values of the highlight region exceed a maximum channel value according to a predetermined data precision, and a highlight recovery circuit configured to perform a hue correction process on the updated channel values of the one or more highlight regions of the image, wherein performing the hue correction process comprises processing the updated channel values to generate final channel values that i) satisfy the predetermined data precision and ii) recover hue values of the one or more highlight regions of the image, wherein performing the hue correction process comprises, for each highlight region in the image:

calculating hue values including adjusting the respective updated channel values for each of the one or more channels of the highlight region, wherein the hue values represent a proportion of the updated channel values of the channels;

generating a clipped channel value for each of the one or more channels, wherein the clipped channel value equals the respective updated channel value if the updated channel value is less than or equal to the maximum channel value, and equals the maximum channel value if the updated channel value is greater than the maximum channel value; and calculating a final channel value for each of the one or more channels including adjusting the respective clipped channel values using the respective hue values to emulate the proportion of the updated channel values of the channels.

2. The system of claim 1, wherein the highlight regions are individual pixels and wherein the one or more channels comprise an R channel, a G channel, and a B channel.

3. The system of claim 1, wherein the highlight regions are groups of four pixels arranged in two-by-two grids in a color filter array, wherein each of the pixels has a single value representing a single color, and wherein the one or more channels comprise the values of the four pixels.

4. The system of claim 1, wherein calculating, for each highlight region in the image, hue values further comprises:
determining a measure of central tendency of the respective updated channel values of the one or more channels of the highlight region; and
calculating hue values including adjusting the respective updated channel values for each of the one or more channels using the measure of central tendency of the updated channel values of the highlight region.

5. The system of claim 4, wherein calculating, for each highlight region in the image, a final channel value for each of the one or more channels comprises:
determining a measure of the central tendency of the clipped channel values of the one or more channels; and
calculating a final channel value for each of the one or more channels including adjusting the respective clipped channel values using the respective hue values and the measure of central tendency of the clipped channel values of the highlight region.

6. The system of claim 5, wherein for each highlight region:
the measure of central tendency of the updated channel values and the clipped channel values of the one or more channels is a mean of the respective channel values; and
calculating the hue values of the one or more channels comprises:
generating initial hue values by calculating the difference between the updated channel values and the mean of the updated channel values; and
generating the hue values by normalizing the initial hue values comprising dividing the initial hue values by a length of a first vector wherein each element of the first vector is an initial hue value.

7. The system of claim 6, wherein calculating the final channel values of the one or more channels comprises:
generating scaled hue values by scaling the hue values by a length of a second vector, wherein each element of the second vector is a difference between the clipped channel value of a channel and the mean of the clipped channel values; and
generating the final channel values by adding the scaled hue values to the mean of the clipped channel values.

8. A method comprising:
receiving raw image data of an image, the raw image data comprising, for each of a plurality of highlight regions in the image, original channel values for one or more channels of the highlight region;
processing the raw image data to generate updated image data, wherein the updated image data comprises updated channel values for each highlight region in the image, and wherein, for each of one or more highlight regions of the image, one or more updated channel values of the highlight region exceed a maximum channel value according to a predetermined data precision; and
performing a hue correction process on the updated channel values of the one or more highlight regions of the image, wherein performing the hue correction process comprises processing the updated channel values to generate final channel values that i) satisfy the predetermined data precision and ii) recover hue values of the one or more highlight regions of the image, wherein performing the hue correction process comprises, for each highlight region in the image:
calculating hue values including adjusting the respective updated channel values for each of the one or more channels of the highlight region, wherein the hue values represent a proportion of the updated channel values of the channels;
generating a clipped channel value for each of the one or more channels, wherein the clipped channel value equals the respective updated channel value if the updated channel value is less than or equal to the maximum channel value, and equals the maximum channel value if the updated channel value is greater than the maximum channel value; and
calculating a final channel value for each of the one or more channels including adjusting the respective clipped channel values using the respective hue values to emulate the proportion of the updated channel values of the channels.

9. The method of claim 8, wherein the highlight regions are individual pixels and wherein the one or more channels comprise an R channel, a G channel, and a B channel.

10. The method of claim 8, wherein the highlight regions are groups of four pixels arranged in two-by-two grids in a color filter array, wherein each of the pixels has a single value representing a single color, and wherein the one or more channels comprise the values of the four pixels.

11. The method of claim 8, wherein calculating, for each highlight region in the image, hue values further comprises:
determining a measure of central tendency of the updated channel values of the one or more channels of the highlight region; and
calculating hue values including adjusting the updated channel values for each of the one or more channels using the measure of central tendency of the updated channel values of the highlight region.

12. The method of claim 11, wherein calculating, for each highlight region in the image, a final channel value for each of the one or more channels comprises:
determining a measure of the central tendency of the clipped channel values of the one or more channels; and
calculating a final channel value for each of the one or more channels including adjusting the respective clipped channel values using the respective hue values and the measure of central tendency of the clipped channel values.

13. The method of claim 12, wherein for each highlight region:
the measure of central tendency of the updated channel values and the clipped channel values of the one or more channels is a mean of the respective channel values; and
calculating the hue values of the one or more channels comprises:
generating initial hue values by calculating the difference between the updated channel values and the mean of the updated channel values; and
generating the hue values by normalizing the initial hue values comprising dividing the initial hue values by a length of a first vector wherein each element of the first vector is an initial hue value.

14. The method of claim 13, wherein calculating the final channel values of the one or more channels comprises:
generating scaled hue values by scaling the hue values by a length of a second vector, wherein each element of the second vector is a difference between the clipped channel value of a channel and the mean of the clipped channel values; and generating the final channel values by adding the scaled hue values to the mean of the clipped channel values.

15. One or more non-transitory computer storage media encoded with computer program instructions that when executed by a plurality of computers cause the plurality of computers to perform operations, the operations comprising:

receiving raw image data of an image, the raw image data comprising, for each of a plurality of highlight regions in the image, original channel values for one or more channels of the highlight region;

processing the raw image data to generate updated image data, wherein the updated image data comprises updated channel values for each highlight region in the image, and wherein, for each of one or more highlight regions of the image, one or more updated channel values of the highlight region exceed a maximum channel value according to a predetermined data precision; and performing a hue correction process on the updated channel values of the one or more highlight regions of the image, wherein performing the hue correction process comprises processing the updated channel values to generate final channel values that i) satisfy the predetermined data precision and ii) recover hue values of the one or more highlight regions of the image, wherein performing the hue correction process comprises, for each highlight region in the image:

calculating hue values including adjusting the respective updated channel values for each of the one or more channels of the highlight region, wherein the hue values represent a proportion of the updated channel values of the channels;

generating a clipped channel value for each of the one or more channels, wherein the clipped channel value equals the respective updated channel value if the updated channel value is less than or equal to the maximum channel value, and equals the maximum channel value if the updated channel value is greater than the maximum channel value; and calculating a final channel value for each of the one or more channels including adjusting the respective clipped channel values using the respective hue values to emulate the proportion of the updated channel values of the channels.

* * * * *